Nov. 18, 1969 P. GINDER 3,479,156

MULTILAYER MAGNETIC COATING

Filed Oct. 20, 1966 2 Sheets-Sheet 1

INVENTOR.

PAUL GINDER

BY Flam and Flam

ATTORNEYS

MULTILAYER MAGNETIC COATING

Filed Oct. 20, 1966 2 Sheets-Sheet 2

INVENTOR.
PAUL GINDER
BY Flam and Flam
ATTORNEYS 3,479,156
MULTILAYER MAGNETIC COATING
Paul Ginder, Lakewood, Calif., assignor to Burton Silverplating Co., Los Angeles, Calif., a corporation of California
Filed Oct. 20, 1966, Ser. No. 592,961
Int. Cl. C23c *17/00;* C23b *5/50*
U.S. Cl. 29—183.5 17 Claims

ABSTRACT OF THE DISCLOSURE

A multilayer magnetic coating comprising a plurality of high coercivity ferromagnetic thin films alternately disposed with, and separated by, a plurality of nonmagnetic barrier layers. Each barrier layer preferably comprises a metal of the platinum group and, to insure layer continuity, has a minimum thickness of 500 A. The thickness of each ferromagnetic film is less than 14,000 A., and preferably about 3,000 A. Being isolated by the barrier layers, each ferromagnetic film exhibits single magnetic domain characteristics of high coercivity and high hysteresis loop squareness. The inventive coating exhibits an overall coercivity and loop squareness commensurate with that of an individual single domain magnetic film, and a remanence considerably greater than that of such an individual film.

The present invention relates to a magnetic composite, and more particularly to a multilayer, thin film magnetic coating useful for high density digital magnetic recording.

Large capacity data storage in computers primarily is accomplished using magnetic storage devices in the form of discs, drums, tapes and the like. In these devices, binary digits (bits) are represented by opposite states of magnetization of portions of the magnetic material included in the surface coating of the device. These opposite states are recognized by detecting the voltage induced in a sensing coil or reading head which experiences motion with respect to the recording surface.

To achieve high density recording capability, there are two parallel requirements for the signal emerging from the reading head: high output level and optimum pulse resolution. The signal output must be sufficiently greater than the system noise to allow unambiguous and error free detection of the binary information. Concomitantly, it is important that adjacent pulses can be resolved clearly. Thus, if the reading head begins to read one transition before it has finished sensing the previous one, the two successive pulses may not be distinguished, with a resultant loss of data.

Since the reading head output arises from the time rate of change of flux through the sensing coil, it is important for optimum data pulse resolution that the position rate of change of magnetization along the recording surface be as great as possible. That is, the transition region between oppositely magnetized regions should be as narrow as possible. To accomplish this requires that the magnetic material of the recording surface have a high coercivity, and a high hysteresis loop squareness. Simultaneously, a high remanence is desired so that the flux level, and hence the resultant reading head output amplitude is maximized.

Presently used single layer magnetic coatings suffer from the handicap that high coercivity and high hysteresis loop squareness only can be achieved at the expense of reduced remanence. For example, in such a single layer magnetic coating (of the electroless or electroplated type now commonly used), as the thickness of the coating is increased, remanence increases, but coercivity and loop squareness decrease. Thus, these opposing parameters place an upper limit on the recording density which may be achieved with these coatings.

The invention which forms the subject matter of this application provides a magnetic coating which fulfills the above stated requirements for a high density magnetic recording medium. The invention utilizes a multilayer structure wherein thin layers of ferromagnetic material are alternated with barrier films of a material having approximately unity specific permeability, which barrier films prevent the magnetic domains of one ferromagnetic layer from joining the domains of adjacent ferromagnetic layers. The result is a magnetic structure having high coercivity, high hysteresis loop squareness, and high remanence.

Accordingly, it is an object of this invention to provide a magnetic coating having high coercivity, high hysteresis loop squareness, and high remanence.

It is another object of this invention to provide a multilayer thin film magnetic structure useful as a high density magnetic recording medium for digital data.

It is another object of this invention to provide a magnetic coating having a plurality of thin layers of ferromagnetic material alternated with a plurality of barrier films of a material having a specific permeability of approximately unity.

It is a further object of this invention to provide a magnetic coating which may be applied to discs, drums, tapes, or memory devices having other configurations.

Still another object of this invention is to provide a multilayer magnetic composite which may be prepared using well known methods for the production of thin films of metals, and which exhibits superior magnetic qualities to those of a single layer magnetic structure of equal thickness.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figure 1:
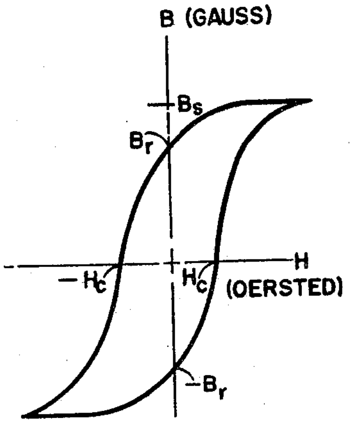
FIGURE 1 is a graphical representation of a typical hysteresis loop for a thick layer or bulk ferromagnetic material.

The magnetic characteristics of a typical thick film or bulk specimen of ferromagnetic material when subjected to an external, cyclically applied magnetic field is shown in the hysteresis curve of FIGURE 1. In this graph, the magnetic induction or flux density B (in gauss as plotted along the ordinate) is shown as a function of magnetic intensity H (in oersteds as measured along the abcissa). Should the thick ferromagnetic film be subjected to a sufficiently intense external magnetic field, the material will become magnetized to its saturation value $B_s$. When the external magnetic field is reduced to zero, the material remains partially magnetized with a residual induction $B_r$ (also called remanence) somewhat lower than the value of saturation induction $B_s$. This ratio $B_r/B_s$ is a measure of the squareness of the hysteresis loop. As shown in FIGURE 1, the coercive force $H_c$ (or $-H_c$) is the value of externally applied magnetic intensity required to cause a residually magnetized sample to alter the sense of its net magnetic induction.

The magnetic induction B of a ferromagnetic material represents the net magnetic field resulting from the contribution of a large number of small regions called magnetic domains. Within each domain, essentially all of the electron spin magnetic moments are aligned along one direction; hence the domain magnetization has its saturation value, and is polarized along the common spin axis direction. The net magnetic moments of other domains are polarized along other directions in such a way that the net magnetic induction of the whole sample may be zero.

Magnetic domains are affected by an externally applied field in two distinct ways. First, the domain boundaries may shift, enlarging those domains whose polarization direction is parallel or nearly parallel to the field. At higher values of magnetic intensity H, the direction of polarization of a domain may shift suddenly, to take any one of a number of discrete, preferred directions relative to the crystal axes. Not all of these possible directions are equally favored; some are called directions of easy magnetization, others, directions of hard magnetism. When the magnetic intensity H becomes sufficiently large, a condition is reached wherein no additional domain growth or polarization redirection is possible; the ferromagnetic sample then is considered to be saturated, and the net resultant magnetic induction has the value $B_s$ as shown in FIGURE 1.

When the external magnetic field is removed from a saturated bulk ferromagnetic sample, a spontaneous rearrangement of the magnetic domains in the sample occurs. The domains reconfigure themselves so as to establish an equilibrium condition at which their total energy is a minimum. The sample residual induction or remanence $B_r$ then is just the net magnetization resulting from the combination of all of the equilibrium configured domain magnetic moments.

Four energy components contribute to the domain energy which must be minimized in the absence of an external magnetic field. The exchange energy would be zero if the electron spins were parallel, and the anisotropy energy would be zero if the spins were oriented along directions of easy magnetization in the crystal. The magnetostatic energy, associated with magnetic poles, is at a minimum when there is a minimum of poles both on the surface and inside the crystal. Magnetostrictive energy is associated with the tendency of domains to change length along their direction of magnetization. When the magnetization vectors in neighboring domains are not parallel, elastic stresses occur; the elastic energy associated with these stresses is called the magnetostrictive energy.

Figure 2:
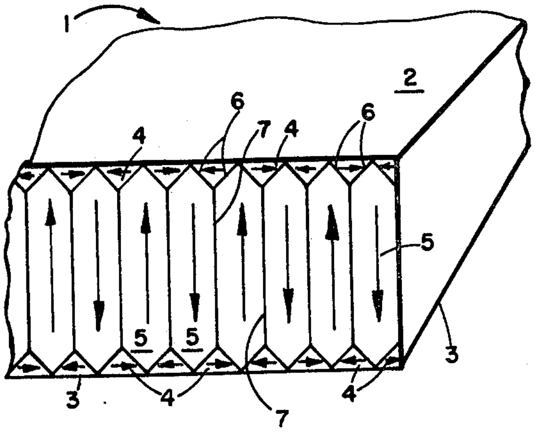
FIG. 2 is a perspective view in partial section of a typical magnetic domain arrangement in a ferromagnetic material having a cubic crystalline structure.

Iron and some of its alloys have a body centered cubic crystalline structure, with the direction of easy magnetization along the 100 crystallographic plane. FIGURE 2 shows a domain pattern typically exhibited by such a body centered cubic ferromagnetic material under minimum energy conditions in the absence of an external magnetic field. FIGURE 2 is a section in the 100 plane, which in this example is illustrated as being perpendicular to surfaces 2 and 3 of ferromagnetic thick film or bulk sample 1.

As may be seen in FIGURE 2, the triangular domains of closure 4 carry flux (indicated by the arrows) from one large domain 5 to another, thus forming closed flux circuits. Since the normal components of magnetization is constant across the walls 6 between domains 5 and domains of closure 4, magnetostatic energy is at a minimum. The magnetostrictive energy arises because the magnetic moments of the domains of closure 4 are perpendicular to those in domain 5; since each domain tends to elongate in the direction of magnetization, elastic stresses occur resulting in the magnetostrictive energy and the exchange energy. The domain wall energy is the sum of the anisotropy energy and the exchange energy. The successive spin orientations across an interdomain wall 7 change gradually from the orientation on one side to that on the other side, consequently, most of the spins do not lie along an easy direction and therefore have anisotropy energy. Also, neighboring spins deviate in direction by a slight angle, which give rise to exchange energy.

Nickel crystals are also cubic, with their direction of easy magnetization in the 111 crystallographic plane. Domain patterns such as shown in FIGURE 2 also may be observed in nickel in the 111 plane. Other domain patterns would be observed in other crystallographic planes.

Figure 3:
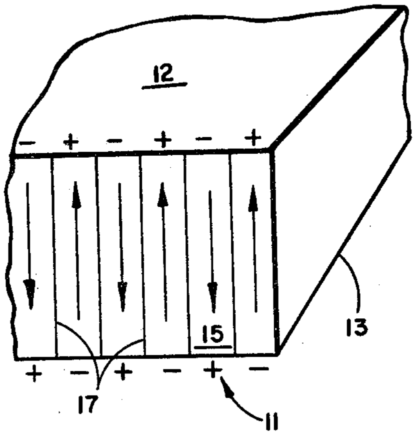
FIG. 3 is a perspective view in partial section of a typical magnetic domain arrangement in a ferromagnetic material having a hexagonal crystalline structure.

Cobalt is a ferromagnetic material having a hexagonal crystalline structure, with its direction of easy magnetization along the *c* axes. FIGURE 3 shows the domain configuration under minimum domain energy, no external magnetic field, conditions for such a hexagonal ferromagnetic material. FIGURE 3 is a section in the 11.0 plane, which here is illustrated perpendicular to surfaces 12 and 13 of thick film or bulk specimen 11; the arrows indicate the direction of polarization of the domain magnetic moments. With the domain structure shown in FIGURE 3, magnetostrictive energy is at a minimum, however magnetostatic energy arises because of the existence of magnetic poles (indicated by the + and − symbols in FIGURE 3) on surfaces 12 and 13. Wall energy associated with walls 17 between domains 15 arises from the same source as described above in connection with FIGURE 2.

The domain configuration illustrated in FIGURES 2 and 3 are typical of those which occur in thick films or bulk samples of ferromagnetic materials. They represent the minimum energy equilibrium configurations which the domain systems reach in the absence of an external magnetic field. When the dimensions of the specimen are diminished, the relative contributions of the various energy terms to the total energy are changed, and the wall energies become more important than the magnetostatic and magnetostrictive energies. When very small dimensions are reached, there arrives a point at which it is favorable energetically to do away with the domain boundries, so that the entire specimen becomes one domain. A theoretical discussion of this phenomena may be found in the article by Charles Kittel entitled "Theory of the Structure of Ferromagnetic Domains in Films and Small Particles," published in Physical Review, vol. 70, No. 11, December 1946, at pages 965 to 971.

Figure 4:
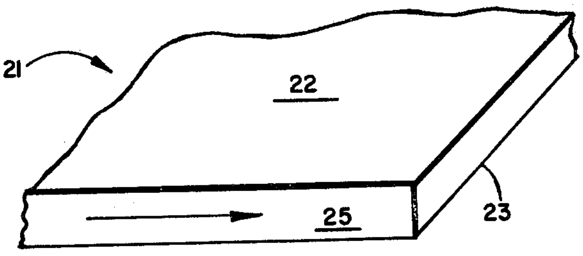
FIG. 4 is a perspective view in partial section of a single magnetic domain situation which may occur in a very thin film of ferromagnetic material.

FIGURE 4 shows in partial section the single domain pattern of a typical thin film 21 of ferromagnetic material having its direction of easy magnetization in a plane perpendicular to surfaces 22 and 23. The arrow indicates that the direction of the net domain magnetic moment is in the plane of the film. If film 21 is sufficiently thin, such a single domain configuration will be assumed by the ferromagnetic material regardless of whether it is cubic, hexagonal, or of other crystalline shape. Also, threads and particles of ferromagnetic material, if their width dimensions are sufficiently small, will exhibit a single domain minimum energy configuration in the absence of an external magnetic field.

Figure 5:
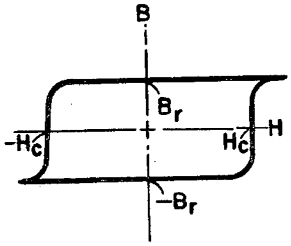
FIG. 5 is a graphical representation of a typical hysteresis loop for a very thin film of ferromagnetic material.

FIGURE 5 shows a typical hysteresis loop for a single domain ferromagnetic material such as the thin film illustrated in FIGURE 4. As indicated by the graph of FIGURE 5, such single domain materials exhibit high loop squareness, and high values of coercive force. Recall that the remanence $B_r$ is the resultant magnetic induction after the magnetic domains of a material have reached their minimum energy configuration in the absence of an external magnetic field. In a single domain material the minimum energy configuration (one domain, all electron spin magnetic moments aligned) is essentially the same as the domain configuration at saturation; hence the ratios $B_r/B_s$, or loop squareness is close to unity.

The high coercive force shown in FIGURE 5, and typical of a single domain ferromagnetic material, may be understood by recalling that under the influence of an external magnetic field, the domains of a thick film or bulk ferromagnetic material first begin to grow by wall motion. Only when subjected to higher values of magnetic intensity does spin realignment occur. In a single domain material, no wall growth is possible. Moreover, since essentially all of the spin magnetic moments in the single domain are aligned with each other, a very strong external magnetic field (i.e., a high coercive force) is required to cause the moments to realign with the external field. When this value of coercive force is reached, most of the spin magnetic moments realign themselves simultaneously. This results in a very abrupt change in magnetic intensity B when $H_c$ is reached, as indicated by the essentially vertical portions of the hysteresis curve of FIGURE 5.

Another feature of the hysteresis loop for a single domain ferromagnetic sample evident in FIGURE 5 is the relatively small value of $B_r$. This results becuase the sample, such as the thin film of FIGURE 4, has very little mass; that is, the total number of spin magnetic moments per unit surface area of the single domain sample is small compared with that of a thick film or bulk material such as illustrated in FIGURES 2 and 3.

The thickness below which a film of ferromagnetic material in the absence of an external magnetic field assumes a single domain configuration varies somewhat depending on a number of factors. These factors include among others the composition of the material, its crystalline structure, and the degree to which there is uniform crystalline orientation with in the sample. The theoretical value at which this transition to a single domain configuration occurs for a uniaxial anistropic ferromagnetic film having its direction of easy magnetization perpendicular to the plane of the film is about 3000 A.

For most commonly used ferromagnetic materials such as alloys of iron, cobalt and nickel, the transition from multi-domain to single domain equilibrium configuration with decreasing film thickness is somewhat gradual. This is reflected by the graph of FIGURE 6, which shows a plot of $H_c$ versus thickness for a typical ferromagnetic alloy such as 30–70 nickel-cobalt. The values shown are to be understood as typical only; actual values may vary considerably depending on the composition of the alloy, the degree of crystalline isotropy, and on other conditions. However, the property of increasing coercivity with decreasing film thickness, reflecting the trend toward a single domain configuration, and illustrated generally by the graph of FIGURE 6, is common to most ferromagnetic materials.

Figure 6:
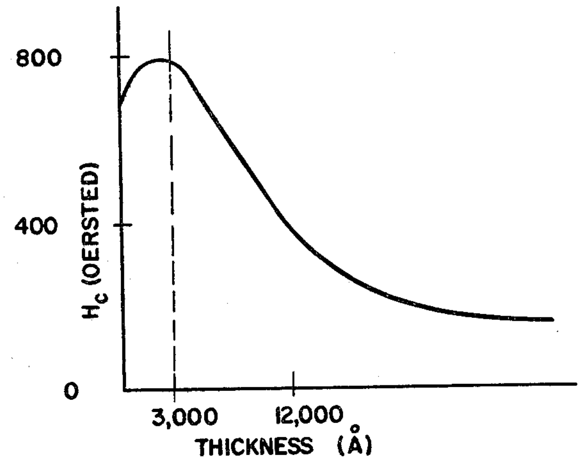
FIG. 6 is a graphical representation of coercive force as a function of thickness for a typical ferromagnetic material.

The general characteristics of increasing $H_c$ with decreasing thickness illustrated in FIGURE 6, also is exhibited by films comprising a mixture of ferromagnetic and non-ferromagnetic materials. In such films, the net magnetic properties indicate the presence of single magnetic domain ferromagnetic particles, with perhaps some interaction between the particles.

Figure 7:
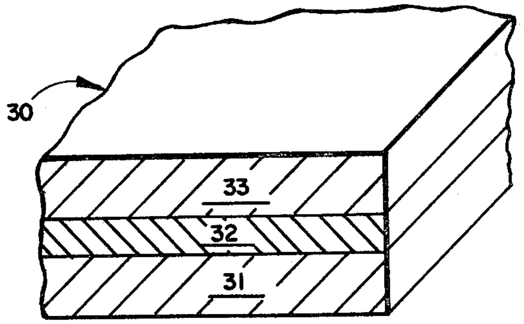
FIG. 7 is a perspective view of one embodiment of the invention disclosed herein, in partial section and in partial elevation.

The high coercive force and high hysteresis loop squareness shown by FIGURE 5 as typical of thin ferromagnetic films are properties which are very desirable in a magnetic digital recording medium. However, as noted earlier, high density recording also requires that the remanence $B_r$ of the magnetic materials also be large in value, which property is not obtainable from a single thin ferromagnetic film. FIGURE 7 shows one embodiment of the inventive magnetic structure or coating which combines the properties of high $H_c$ and high loop squareness typical of a single thin ferromagnetic film with the high $B_r$ values usually associated with a thick film.

Referring now to FIG. 7 there is shown a magnetic structure 30, the length and width dimensions of which are large compared with the total thickness of the structure. Structure 30 includes layers 31 and 33, each of ferromagnetic material, separated by a thin barrier layer 32 of non-ferromagnetic material. For the purposes of this application, the term "non-ferromagnetic material" is to be understood as referring to a material which is neither ferromagnetic, anti-ferromagnetic, nor ferrimagnetic.

Layers 31 and 33 each comprise a ferromagnetic thin film, the thickness of which may be sufficiently small, i.e. in the order of 3,000 A., such that the films exhibit the high coercivity and high loop squareness characteristics associated with single magnetic domain materials, as described hereinabove in conjunction with FIGS. 4 and 5. Alternately, ferromagnetic layers 31 and 33 may be somewhat thicker, but preferably less than 14,000 A. thick, to achieve higher values of remanence than obtainable with single domain films, with only slight decrease in coercivity (see e.g., FIG. 6) and loop squareness.

As illustrated in FIGURE 7, barrier layer 32 comprises a thin film disposed in a continuous layer between, and in intimate contact with ferromagnetic layers 31 and 33. Barrier layer 32 comprises a material which prevents the magnetic domains of ferromagnetic layer 31 from joining the domains of layer 33, either in the presence of an external magnetic field, or when the domains reconfigure themselves into a minimum energy configuration in the absence of an external field. Further, barrier layer 32 itself preferably should exhibit a specific permeability of approximate unity.

The magnetic properties of barrier layer 32 may be understood by recalling that the specific permeability $K_m$ of a material is defined as the ratio of $\mu/\mu_o$ where $\mu$ is the permeability of the material under consideration and $\mu_o$ is the permeability of free space. Specific permeability is related to the susceptibility $X_m$ of the material by the relationship $$X_m = K_m - 1 \quad (1)$$

In a paramagnetic or diamagnetic material the magnetic induction B is related to an externally supplied magnetic field H by the equation $$B = \mu H = K_m \mu_o H \quad (2)$$

Thus when a magnetic field is applied to structure 30, the magnetic induction B present within barrier layer 32 having approximately unity specific permeability is essentially the same as that which would be present were barrier layer 32 replaced by a layer of air of equal thickness. Further, barrier layer 32 makes negligible contribution to the residual magnetic induction of structure 30.

In the absence of an external magnetic field, ferromagnetic thin film layers 31 and 33 (see FIG. 7) each independently assume a minimum energy domain configuration, which may, for example, resemble the single domain situation illustrated in FIG. 4. This is consistant with the presence of the barrier layer 32 which constrains the domains of ferromagnetic layer 31 from joining (e.g., growing to include) domains of layer 33. When an external magnetic field H is applied to structure 30, the individual ferromagnetic layers 31 and 33 each appear to behave as independent thin films, and exhibit, for example, such properties as described above in conjunction with FIGS. 4 and 5.

Figure 8:
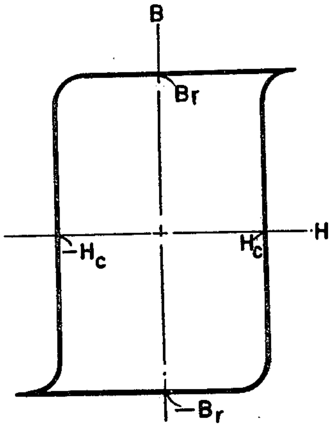
FIG. 8 is a graphical representation of a typical hysteresis loop for the multilayer magnetic composite embodying the present invention.

As a result of the above considerations, magnetic structure 30 as a whole exhibits characteristics which represent the cumulative properties of the individual ferromagnetic layers which it includes. Thus if layers 31 and 33 individually exhibit high values of coercive force and loop squareness, structure 30 also will exhibit these qualities. Moreover, the net value of residual magnetic induction or remanence of structure 30 will be greater than that of any individual ferromagnetic layer included in the structure, and may equal the sum of the individual layer remanence values. FIG. 8 shows a typical hysteresis loop for an embodiment of the subject invention configured such as structure 30, and having ferromagnetic layers 31 and 33 which independently exhibit identical magnetic properties. Comparison of FIG. 8 with FIG. 5 (which shows a hystersis loop typical of either thin film 31 or 33 by itself) indicates the improvement in remanence which may be achieved by using magnetic structure or coating 30 instead of a single thin film of ferromagnetic material. Note also that there is only minimal reduction in coercivity and loop squareness as compared with the individual layer characteristics. Thus magnetic structure 30 exhibits all of the characteristics desirable for a high density, digital magnetic recording medium.

It will be appreciated that the subject invention is not limited to the structure wherein each ferromagnetic layer has identical magnetic characteristics. Thus, for example, a particular application may require a magnetic coating having a hysteresis loop of some irregular shape, or, e.g., a coating having different magnetic properties in two directions. Either of these effects may be achieved by appropriate combination of ferromagnetic layers having independently different magnetic characteristics. As noted earlier, the magnetic properties of the resultant multilayer structure will resemble the combination of the characteristics of the individual ferromagnetic layers in the composite.

Comparison of FIG. 8 with FIG. 1 discloses the significant improvements in loop squareness and coercivity which may be achieved by using magnetic stucture or coating 30 in place of a single thick film or bulk sample of ferromagnetic material, such as that described above in conjunction with FIGS. 2 and 3. Note that values of $B_r$ equal to or greater than those obtainable with a single thick film are possible to obtain using the inventive multilayer thin film structure.

It has been found that the metals of the platinum group, including platinum (Pt), palladium (Pd), rhodium (Rh), iridium (Ir), osmium (Os), and ruthenium (Ru), and alloys containing these metals, are suitable for use as the barrier layer 32. These materials are dense, having specific gravity values between 11 (Pd) and 23 (Ir); this characteristic appears to be desirable. While the resistivity values of the platinum group vary between 4.5 microohm-centimeters (Rh) and 19.3 microohm-centimeters (Ru), these values appear to be sufficiently large so as to prevent deleterious eddy current effects within the barrier layer.

It is to be understood that the present invention is not limited to embodiments which use metals of the platinum group for barrier layer 32. Other non-ferromagnetic materials also may be used for the barrier. It is preferable, however, that the barrier material exhibit a resistivity greater than about 4 microohm-centimeters, as lower resistivity materials exhibit eddy current effects which appear to impair the overall magnetic characteristics of the multilayer composite.

Using such materials as described in the immediately preceding paragraphs, films having a thickness of at least 500 A. have been found to provide satisfactory barrier layers for the purpose of the subject invention. Films less than about 500 A. thick tend to be non-continuous or porous, and thus not provide complete isolation of the ferromagnetic layers which they separate. Thus, for example, were ferromagnetic layer 33 disposed on a non-continuous barrier layer, some of the ferromagnetic material may distribute through the gaps in the barrier layer and come in contact with ferromagnetic layer 31. This would allow the magnetic domains of layer 31 to join the domains of layer 33; the two ferromagnetic layers then may behave magentically as one thick layer, rather than as two independent layers.

It will be appreciated that while the structure of FIG. 7 has only two layers of ferromagnetic material and one barrier layer, the invention is not so limited. Thus additional alternating thin film layers of ferromagnetic and barrier materials may be added to achieve particular performance characteristics. For example, using ferromagnetic films individually exhibiting the characteristics of FIG. 5, increasing remanence wtih minimal decrease in loop squareness or coercivity results as layers are added. Alternatively, multiple layers, some having different individual magnetic characteristics, may be combined to produce other desired composite magnetic properties. It will also be appreciated that the inventive multilayer structure or coating may be disposed on a suitable substrate, so as to provide an embodiment such as that illustrated in FIG. 9.

Figure 9:
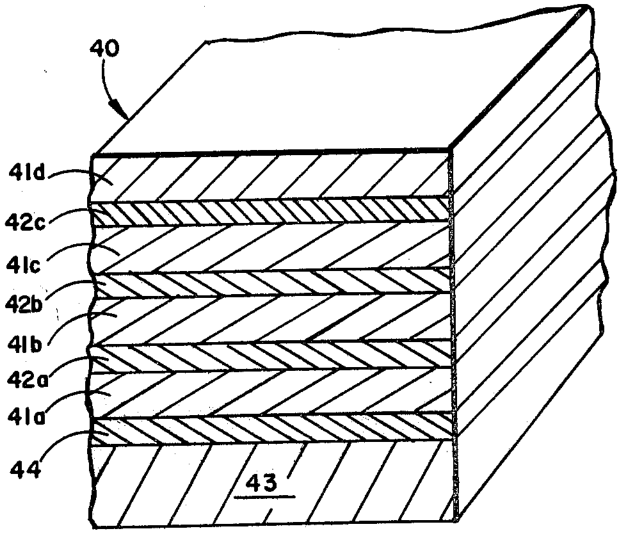
FIG. 9 is a perspective view, in partial section and partial elevation, of another embodiment of the invention.

Referring now to FIG. 9 there is shown another embodiment 40 of the invention, wherein thin film layers **41*a*, 41*b*, 41*c*, and 41*d* of ferromagnetic material are alternated with barrier layers 42*a*, 42*b*, and 42*c* on a substrate 43. Substrate 43 may be of any material, well known to those skilled in the art, on which coatings may be disposed. For example, if the magentic coating were to be used as part of a disk or drum memory, substrate 43 may be aluminum or magnesium. In this respect, while FIGS. 7 and 9 illustrate the thin layers of ferromagnetic and non-ferromagnetic material as being flat, the invention is not so limited, and said layers may be curved, for example, to conform generally to the cylindrical shape of a drum. Alternatively, substrate 43 may be of a non-metallic material, such as plastic or ceramic. Thus, for example, the inventive coating may be applied to an appropriately treated flexible plastic substrate, so as to make a recording tape suitable for high density digital recording. The inventive magnetic coating might also be used in a structure which includes appropriate write current and sense wires well known to those skilled in the art, so as to form a complete thin film memory. Ferromagnetic film layers 41** (see FIG. 9) may be sufficiently thin, in the order of 3,000 A., so as to exhibit the characteristics associated with a single domain minimum energy configuration material, such as described above in conjunction with FIGS. 4 and 5. Alternatively, slightly thicker films (having a maximum thickness of about 14,000 A.) also may be used, e.g., to obtain higher individual layer remanence values.

To obtain such thin films, layers 41 may be prepared by any techniques well known to those skilled in the art including, but not limited to electrodeposition, autocatalytic deposition (also known as electroless deposition), vacuum deposition, and sputtering. The composition of ferromagnetic material used for layers 41 also is a designer's choice, and may be selected by one one skilled in the art so as to satisfy the requirements of a particular application. For example, different ferromagnetic materials may be selected to achieve different values of $H_c$ for a given thickness of layer 41. Alternatively, some ferromagnetic materials may be easier than others to prepare in thin film form by the particular technique (e.g. electrodeposition) desired for a given application.

In some instances it may be desirable also to provide a thick layer 44 of non-ferromagnetic materials having characteristics similar to those of barrier layer 42, between substrate 43 and the first ferromagnetic layer *41a*, as shown in FIG. 9. Such a layer may be desirable, for example, to minimize induced eddy current effects in a metal substrate. Thus if a substrate having low resistivity is to be used, a layer 44, preferably greater than 10,000 A. thick, may be used to ensure that the magnetic properties of the multilayer coating will not be adversely affected by eddy currents in the low resistivity substrate.

The preparation and characteristics of one embodiment of the inventive multilayer magnetic structure will be described hereinbelow; however, it is to be understood that is is by way of example only, and that many alternate embodiments will be apparent to one skilled in the art.

Suppose that a particular computer assembly requires that an aluminum alloy disk be coated with a magnetic material of total thickness 60 microinches (approximately 15,700 A.). Should a conventional single thick film be employed, typical expected characteristics include: $H_c$=450 oersteds; $B_r$=5,000 gauss; hysteresis loop squareness=0.7–0.75. However, should the disk be coated using the inventive multilayer thin film magnetic coating disclosed herein, the following characteristics may be obtained using four cobalt-nickel ferromagnetic layers each 355° A. thick, alternated with three barrier layers of palladium each 500 A. thick (resulting in a total sandwich thickness of 15,700 A., the same as the single thick film); $H_c$=450 oersteds; $B_r$=8,000 gauss; loop squareness=0.95. In this example, the ferromagnetic layers were autocatalytically deposited using a bath having the following composition:

| Material: | | Amount |
|---|---|---|
| Rochelle salts | lbs./gal | 1.66 |
| Cobalt | ozs./gal | 1.37–1.42 |
| Sodium pyrophosphate | oz./gal | 0.707 |
| Potassium citrate | oz./gal | 0.265 |
| Nickel | oz./gal | 0.0934 |
| Sodium hypophosphite | lb./gal | 0.298 |

The bath was maintained at a temperature of 180°–190° F. and at a pH of 8.4–9.5 throughout the deposition steps.

The barrier layers were prepared using palladium strikes of 30 seconds for each barrier layer. The palladium bath composition was as follows:

| Material: | | Amount |
|---|---|---|
| Palladium | oz./gal | 0.4–0.6 |
| $NH_4Cl$ | ozs./gal | 4 |
| $NH_4OH$ | cc./gal | 15 |

The bath was maintained at a temperature of between 115° F. and 125° F. and at a pH of 8–10 during the palladium layer deposition steps.

While the invention has been described with respect to several physical embodiments constructed in accordance therewith, it will be apparent to those skilled in the art that various modifications and improvements may be made without departing from the scope and spirit of the invention.

The inventor claims:

1. In combination,
a plurality of thin films of high coercivity ferromagnetic metal, each of said films being less than 14,000 A. thick; and
barrier means separating said ferromagnetic films, each said barrier means comprising a continuous film of metal having a specific permeability of approximately unity and a thickness of at least 500 A., said barrier means preventing the magnetic domains of adjacent ferromagnetic films from becoming joined.

2. The combination as defined in claim 1, wherein said barrier means comprises a metal selected from the class consisting of osmium, iridium, platinum, rhodium, ruthium, palladium and alloys thereof.

3. The combination as defined by claim 1, wherein said barrier means metal has resistivity of at least 4 microohm-centimeters.

4. The combination as set forth in claim 1 in which said thin films have individual thicknesses on the order of 3000 A.

5. A magnetic storage device comprising:
a non-ferromagnetic substrate, and, disposed on said substrate, a magnetic coating as defined in claim 1.

6. A device as defined by claim 5, wherein said substrate is metallic.

7. A device as defined by claim 5, wherein said substrate is non-metallic.

8. A magnetic coating comprising:
at least two high coercivity ferromagnetic metallic thin films each less than 14,000 A. thick, alternated with a plurality of layers, each at least 500 A. thick, of non-ferromagnetic metal of constituency different from said thin films, said coating exhibiting a coercivity and loop squareness substantially equal to that of an individual thin film and a remanence greater than that of an individual thin film.

9. A magnetic coating as set forth in claim 8, in which said thin films have individual thicknesses on the order of 3,000 A.

10. A magnetic coating as defined in claim 8, wherein said non-ferromagnetic metal is selected from the class consisting of osmium, iridium, platinum, ruthenium, palladium, and rhodium.

11. A magnetic coating as defined by claim 8, wherein said non-ferromagnetic metal comprises an alloy containing at least one element of the platinum group.

12. A magnetic coating as defined by claim 8, wherein said non-ferromagnetic metal has a resistivity of at least 4 microohm-centimeters.

13. In combination:
a metallic substrate,
a non-ferromagnetic metallic layer disposed on said substrate, said layer having a minimum thickness of about 10,000 A. and a resistivity of at least 4 microohm-centimeters, and
a magnetic coating as defined in claim 8 disposed on said layer.

14. The combination as set forth in claim 13 together with reading means operatively associated with said coating.

15. A magnetic storage device comprising:
a metallic substrate;
a first layer of non-ferromagnetic metal disposed on said substrate;
at least two thin films of high coercivity ferromagnetic metal disposed on said first layer, each of said thin films having a maximum thickness of 14,000 A.; and barrier means separating said ferromagnetic films, each of said barrier means comprising a metallic thin film having a minimum thickness of 500 A. and a specific permeability of approximately unity.

16. A magnetic storage device as defined by claim 15 wherein said first layer has a thickness of at least 10,000 A., a specific permeability of approximately unity, and a resisitivity of at least 4 microohm centimeters.

17. In combination:
means forming a support upon which metallic material may be deposited;
a first film of magnetically hard ferromagnetic material deposited by crystalline growth on said support;
a barrier film deposited by crystalline growth on said first film; and
a second film of magnetically hard ferromagnetic material deposited by crystalline growth on said barrier film;

each of said first and second films having a thickness controlled for determining the hysteresis characteristics thereof, said thickness not exceeding 14,000 A.; said barrier film having a thickness of at least 500 A. and providing a distinct boundary region to prevent the juncture of the magnetic domains of the respective first and second films.

References Cited

UNITED STATES PATENTS

| | | | |
|---|---|---|---|
| 3,089,228 | 5/1963 | Lynch | 29—194 |
| 3,348,931 | 10/1967 | Reekstin | 29—183.5 |
| 3,350,180 | 10/1967 | Croll | 29—183.5 |
| 3,375,091 | 3/1968 | Feldtkeller | 29—194 |
| 3,393,982 | 7/1968 | Fisher et al. | 29—194 |

HYLAND BIZOT, Primary Examiner

E. L. WEISE, Assistant Examiner

U.S. Cl. X.R.

29—194, 195, 199; 340—174